United States Patent
Newberg et al.

(10) Patent No.: US 6,680,930 B2
(45) Date of Patent: *Jan. 20, 2004

(54) METHOD AND APPARATUS FOR DETERMINING AND RESERVING BANDWIDTH FOR TRANSMITTING DELAY-SENSITIVE STREAMING DATA OVER A RADIO FREQUENCY CHANNEL

(75) Inventors: Donald G. Newberg, Hoffman Estates, IL (US); Tyrone D. Bekiares, Lake in the Hills, IL (US); Gregory A. Dertz, Algonquin, IL (US); Bradley M. Hiben, Glen Ellyn, IL (US); Kevin G. Doberstein, Elmhurst, IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/761,423

(22) Filed: Jan. 16, 2001

(65) Prior Publication Data

US 2002/0093983 A1 Jul. 18, 2002

(51) Int. Cl.7 .............................................. H04B 7/212
(52) U.S. Cl. ....................... 370/348; 370/252; 370/330
(58) Field of Search ................................. 370/465, 330, 370/252, 348; 358/133; 709/227; 379/27

(56) References Cited

U.S. PATENT DOCUMENTS

| | | | | |
|---|---|---|---|---|
| 5,881,131 A | * | 3/1999 | Farris et al. | 379/27 |
| 5,896,369 A | | 4/1999 | Warsta et al. | |
| 5,920,865 A | | 7/1999 | Ariga | |
| 6,097,733 A | | 8/2000 | Basu et al. | |
| 6,167,248 A | | 12/2000 | Hamalainen et al. | |
| 6,223,222 B1 | * | 4/2001 | Fijolck et al. | 709/227 |
| 6,282,180 B1 | * | 8/2001 | Paneth et al. | 370/330 |
| 6,359,901 B1 | * | 3/2002 | Todd et al. | 370/465 |
| 6,366,561 B1 | | 4/2002 | Bender | |

* cited by examiner

Primary Examiner—John Pezzlo
(74) Attorney, Agent, or Firm—Steven R. Santema; Terri S. Hughes

(57) ABSTRACT

A radio frequency communications system (100) includes wireless terminals (102) and base sites (104). The wireless terminals communicate with the base sites over a radio frequency channel (106). The base sites are interconnected to each other and other network elements via a packet network. A method and apparatus determine for a particular delay-sensitive application on the wireless terminal, for example, an audio or video transmission, the requirements for bandwidth for transmission over the radio frequency channel (500, 502). After the requirements on the radio frequency channel are determined, the necessary channel bandwidth, if available, is reserved or allocated to guarantee performance to the application (510). The reserved bandwidth is utilized by selectively granting access to the radio frequency channel on the basis of the bandwidth allocated to the device.

23 Claims, 6 Drawing Sheets

METHOD AND APPARATUS FOR DETERMINING AND RESERVING BANDWIDTH FOR TRANSMITTING DELAY-SENSITIVE STREAMING DATA OVER A RADIO FREQUENCY CHANNEL

FIELD OF THE INVENTION

The invention generally relates to packet-based multimedia communications over a wireless network, and in particular, to a method and apparatus for determining and reserving bandwidth for a wireless channel in order to support delay-sensitive, streaming data, such as audio and video data.

BACKGROUND OF THE INVENTION

Wireless data communication systems for transmitting multimedia data, including audio, video and other data, are known. Recently, the explosion in the use of the Internet has dramatically increased multimedia data communication needs, including wireless data communication needs. Internet communications follow a packet-based protocol with wide variance in the size and frequency of packets. Generation of Internet packets generally occurs without regard to the actual physical networks that will carry the data. While this packet-based communication has great advantages, it presents numerous challenges for the efficient transmission of data over a particular physical network.

Known wireless data communication systems that support Internet access are typically a "retrofit" of Internet packets on top of an existing physical network. Unfortunately, these retrofits do not typically efficiently use bandwidth. And, performance is either sacrificed or uncontrolled, where performance includes parameters such as delay and jitter. Most existing systems over engineer the available bandwidth to accommodate a predefined maximum amount of traffic. Although this may be acceptable in wired networks, the limitations on wireless networks do not permit such a luxury. While all wireless packetized data presents some challenge, packetized audio and video streaming data is particularly challenging since the performance, namely, delay and jitter, may inhibit effective communications, in particular in the case of a two-way conversation.

Therefore, a need exists for a new paradigm in the communication of multimedia data over a wireless channel.

DESCRIPTION OF THE PREFERRED EMBODIMENTS

In summary, a method is provided for determining for a particular delay-sensitive application, for example, an audio or video transmission, the requirements for bandwidth for transmission over a wireless channel. After the requirements on the wireless channel are determined, the necessary bandwidth is reserved or allocated to guarantee performance to the application. More specifically, in a delay-sensitive application, resource requirements are transmitted from an initiating wireless terminal to a management device within the network. The application requirements typically include a bit rate, frame rate, encoder/decoder type, or other parameter related to the application. The application requirements are divorced or separate and apart from the wireless channel requirements. The management device converts the received application requirements into channel requirements. That is, the management device converts the application requirements to the availability and data rate for the channel, for example, a number of slots for transmission of this data per second available on a wireless channel. After the channel requirements are determined, the management device determines whether the existing channel, including existing loading, can accommodate the requested channel requirements. If the requested bandwidth is available, the bandwidth is allocated to the requesting device and the device is notified that communications may proceed. After communications are established, the actual traffic required by an application is optionally monitored. The available bandwidth is adjusted accordingly. The management device controls utilization of the reserved bandwidth by selectively granting access to the wireless channel on the basis of the bandwidth allocated to the device. An apparatus for implementing the above-described method is provided.

Figure 1:
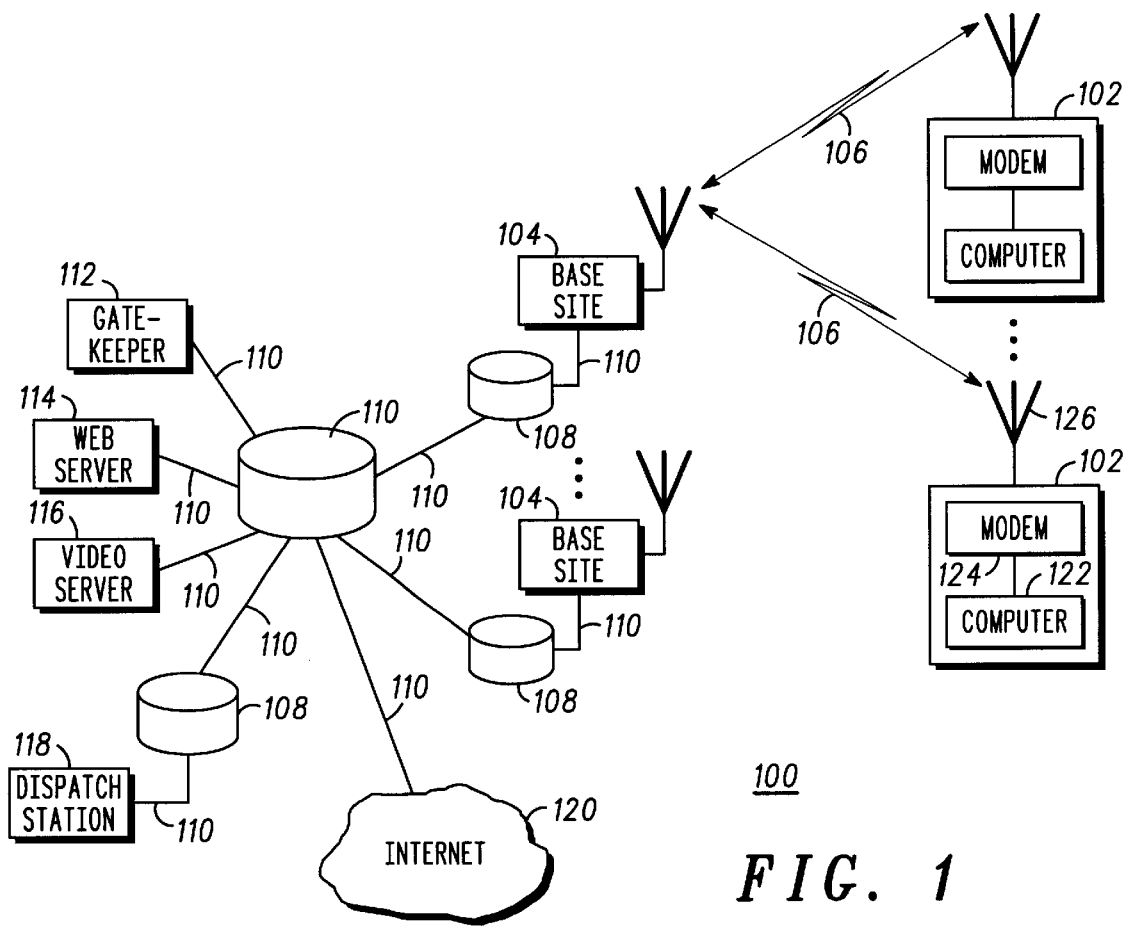
FIG. 1 is a block diagram of a wireless communications system in accordance with the present invention.

FIG. 1 is a block diagram of a preferred embodiment of a multimedia communication system 100 in accordance with the present invention. System 100 includes wireless terminals 102 and radio base sites 104. Wireless terminals 102 communicate over the air with base sites 104. More specifically, wireless terminals 102 and base sites 104 use a radio frequency communications channel, illustrated by arrows 106, to communicate multimedia data, for example, audio, video and other data, to and from each other.

Base sites 104 are radio frequency transmitters and receivers that communicate with wireless terminals 102. In addition, base sites 104 are connected to a network of other elements to facilitate the transmission of data, including multimedia data. As shown in FIG. 1, base sites 104 are connected to routers 108 for the communication of data. Other network elements are interconnected to routers 108 for the transmission of data throughout the network. In FIG. 1, a gatekeeper 112, a Web server 114, a video server 116 and dispatch station 118 are shown interconnected to form a network. These network elements may form a closed private network, such as an intranet and may include access to a public network such as the Internet 120. Communication links 110 couple the various routers and network elements to each other. Any suitable communication links or trunks suffice for communication links 110. In a preferred embodiment, communications links 110 are Ethernet or other communication links, such as T1 communication links.

Gatekeeper 112 is preferably a computer that provides control and management functions associated with the wireless channel used for communication between wireless terminals 102 and base sites 104. Dispatch station 118 is preferably a computer that provides access for the dispatcher role associated with the wireless communication systems used for communication between base sites 104 and wireless terminals 102. Web server 114 is preferably a computer that provides a data communications function such as the provision and access to Web pages. Video server 116 is preferably a computer that provides video services to network elements, including wireless terminals 102 and dispatch station 118.

Wireless terminals 102 preferably include a computer 122 coupled to a modem 124. Modem 124 preferably is connected to an antenna 126 to radiate and receive radio frequency signals to implement the wireless communication channel between wireless terminals 102 and base sites 104. Preferably computer 122 implements an Internet protocol which generates packets that are transferred to modem 124. Modem 124 then converts the IP packets into packets or blocks for transmission over the wireless channel using antenna 126 and an associated protocol for the wireless channel.

In accordance with the present invention, the wireless channel provided for communication between wireless terminals 102 and base sites 104 is managed in a manner to provide efficient bandwidth for diverse communications between wireless terminals 102 and base sites 104. In particular, the wireless channel is managed to provide delay-sensitive data with guaranteed bandwidth over the channel and to accommodate non-delay-sensitive data over the same channel. The provision of these functions is discussed below with respect the preferred embodiments.

Figure 2:
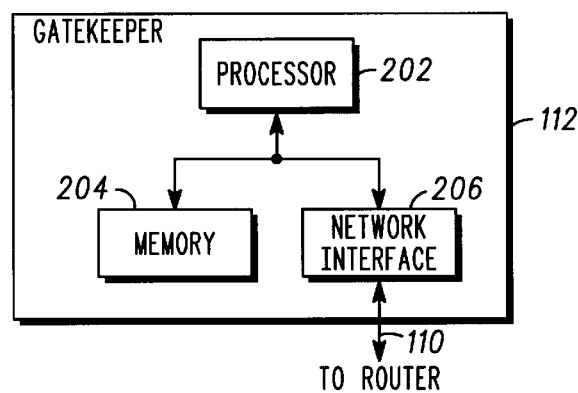
FIG. 2 is a block diagram of a gatekeeper for controlling wireless multimedia communications in accordance with the present invention.

FIG. 2 is a block diagram of a preferred embodiment of gatekeeper 112. Gatekeeper 112 is preferably a server-class, processor-based system. Gatekeeper 112 includes a processor 202, a memory 204 and a network interface 206. Processor 202, memory 204 and network interface 206 are coupled together for the communication of data and commands between these components. Processor 202 executes a program stored in memory 204 to implement various functions, including management and control functions to determine and allocate resources associated with a wireless channel used for communication between wireless terminals 102 and base sites 104. Processor 202 communicates with network interface 206 for the receipt and transmission of data over the associated network. Network interface 206 includes a connection to communication link 110.

In a preferred embodiment, processor 202 preferably is a central processing unit, microprocessor, microcontroller, digital signal processor, or any combination of these. Memory 204 preferably includes volatile and non-volatile memory, including dynamic random access memory, and disk storage. Preferably, network interface 206 implements a TCP/IP network interface for the transmission of Internet protocol (IP) packets.

Figure 3:
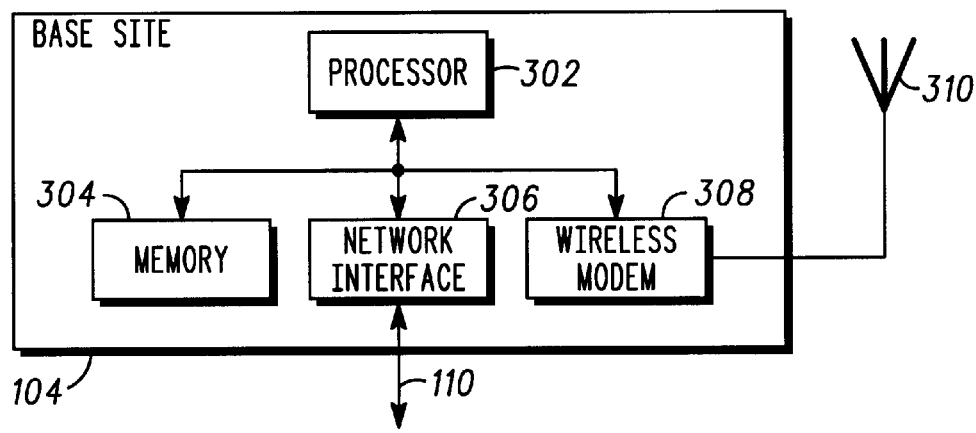
FIG. 3 is a block diagram of a radio base site for wireless multimedia communications in accordance with the present invention.

FIG. 3 is a block diagram of a preferred embodiment of a base site 104 in accordance with the present invention. Base site 104 includes processor 302, memory 304, network interface 306, wireless modem 308 and antenna 310. Processor 302, memory 304, network interface 306 and wireless modem 308 are coupled or interconnected together for the communication of data and commands between these components. Processor 302 executes programs stored in memory 304 for functions of the base site, including control over wireless modem 308, which provides control over the wireless channel coupling base site 104 with wireless terminals 102. Antenna 310 receives and radiates radio frequency signals to implement the wireless channel between wireless terminals 102 and base sites 104. Antenna 310 is connected to wireless modem 308. Network interface 306, under control of processor 302, provides access for base site 104 to other network elements. Network interface 306 is connected to communication link 110.

Figure 4:
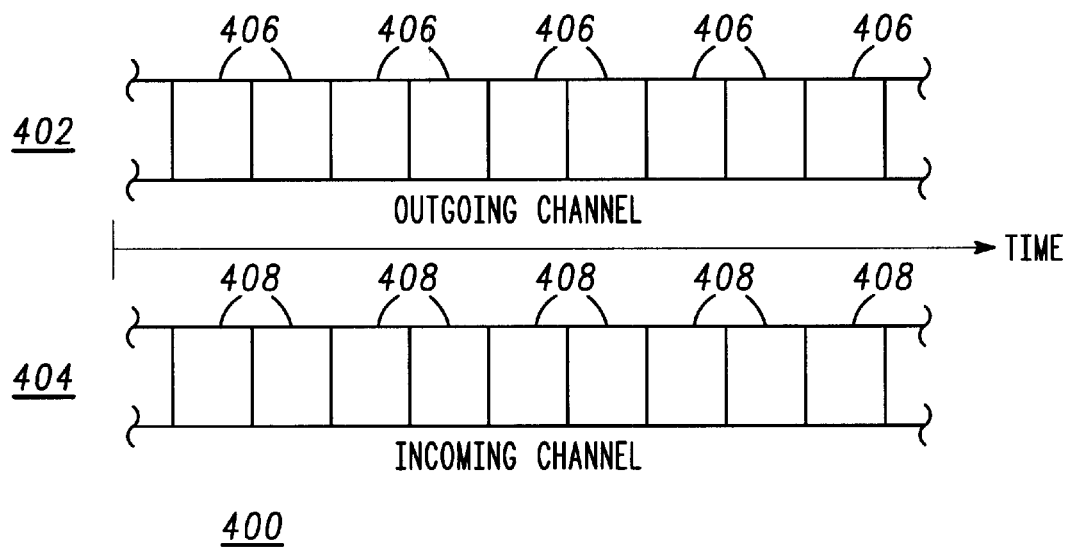
FIG. 4 is a schematic diagram illustrating an incoming and outgoing wireless channel in accordance with the present invention.

FIG. 4 is a schematic diagram illustrating a preferred wireless radio frequency channel in accordance with the present invention. Wireless channel 400 preferably includes an outgoing channel 402 and incoming channel 404. Outgoing channel 402 represents the transmission of data from a base site 104 over the air to a plurality of wireless terminals 102. Incoming channel 404 represents a transmission from a plurality of wireless terminals 102 to a base site 104. As an alternative to using a separate incoming and outgoing channel, time division multiplexing may be used to accommodate both incoming and outgoing communications in a single channel. Also, frequency division and multiplexing are alternatively applied to the channel.

Outgoing channel 402 is divided into slots 406, which occur contiguously over a period of time. Similarly, incoming channel 404 is divided into slots 408, which occur contiguously over a period of time. In the preferred embodiment, outgoing channel 402 has 100 to 400 slots per second occurring where each slot is capable of transmitting about 206 bytes of data. Incoming channel 404 preferably has characteristics that match outgoing channel 402. In a preferred embodiment, a frequency of 746 to 806 megahertz (MHz) is used for wireless channel 400.

To facilitate orderly and efficient use of channel 400 by wireless terminals 102 and base sites 104, slots 406, 408 are preferably organized into slot types, which define a type of data that is transmitted in a particular slot. In contrast to conventional time-division multiplexed channels, slots 406, 408 are not strictly periodically assigned to a particular device or function, rather the assignment of slot types is made selectively and dynamically in a manner to flexibly accommodate varying media and data types. The four slot types defined in a preferred embodiment are random access slots, acknowledgement "ACK" slots, delay-sensitive slots, and non-delay-sensitive slots.

The random access slots are included in incoming channel 404 to allow wireless terminals 102 to reserve or request delay-sensitive slots and non-delay-sensitive slots. Random access slots are also used to transmit data. The random access slots are preferably a slotted-aloha type of slot that is used by wireless terminals 102 as a point of access. In other words, the random access slots are used by wireless terminals to alert a device managing the channel that the wireless terminal has data to be transferred over another slot type. The random access slots are, as the name suggests, randomly accessed by wireless terminals when available, without any arbitration. This allows for the occurrence of collisions between contending wireless terminals.

The delay-sensitive slots carry, as the name suggests, delay-sensitive, streaming data, such as a video data stream or an audio data stream. The non-delay-sensitive slots are allocated for data that is not delay-sensitive, for example Web site pages and the like. Non-delay-sensitive data typically is tolerant of some delay. The non-delay-sensitive slots are used for file transfer and the transmission of other error-intolerant data. The ACK slots are used for the wireless terminals 102 and base sites 104 to acknowledge safe receipt of packets sent over channel 400.

Each wireless terminal 102 and base site 104 has a unique media access control (MAC) address that identifies the device. Since there is competition among the wireless terminals to access the incoming channel slots 408, access must be controlled in some manner. In a preferred embodiment, a channel scheduler is implemented using processor 302, memory 304 and wireless modem 308 to orderly schedule access to incoming slots 408 by wireless terminals 102. More specifically, the channel scheduler determines the allocation of delay-sensitive slots, non-delay-sensitive slots, and ACK slots to particular wireless terminals 102. Most preferably, the outgoing channel 402 includes designations within its slots that specify which incoming channel slots 408 may be used by a particular wireless terminal 102. That is, a wireless terminal 102 determines which incoming slots 408 it may use by decoding this information from a portion of the outgoing channel 402. The random access slots are not dedicated to a particular wireless terminal 102, and therefore may be accessed by any wireless terminal 102. If more than one wireless terminal 102 transmits on a random access slot, a collision occurs, and the access is not subsequently acknowledged. This requires the transmitting wireless terminals 102 to retransmit on another available random access slot.

The outgoing channel 402 has only one transmitter, base station 104. Therefore, there is no contention for transmission on outgoing channel 402. Each wireless terminal 102 that is communicating with channel 400 is required to listen to outgoing channel 402 and respond to data directed to it, as determined by the MAC address.

A method for allocating or reserving resources on channel 400 for delay-sensitive applications such as audio and video transmission, is described below with respect to FIG. 5. This method is described below in the context of a preferred embodiment described above with respect to FIGS. 1–4.

First a delay-sensitive application's requirements are sent to the bandwidth manager (500). This preferably occurs by an application on wireless terminal 102 initiating the transfer of data to other network elements. An exemplary application is an H.323 multimedia call that needs to be placed by a computer 122 of a wireless terminal 102. In accordance with the H.323 standard, certain requirements for the application, such as bit rate, packet size, compression rate, codec type, compression type, total cumulative bit rate, total transmit and receive bit rates, transmit and receive video and audio bit rates, video frame rate, source attributes, distribution of IP packet sizes, are generated per the application. If the data transmission is to be directed over the wireless channel, then the modem 124 must initiate an access to the channel. Preferably, the communications between the physical network, modem 124, and the H.323 application occur via a layered network protocol.

Preferably, the access to the channel to transfer the application requirements requires that the wireless terminal 102 gain access to the incoming channel 404. To gain access, wireless terminal 102 must transmit on a random access slot the requirements for the desired application. If the random access slot transmission of the application requirements is successful, that is, there are no collisions, then the request is routed to gatekeeper 112, which preferably serves as the bandwidth management device. Another network element, such as base site 104, alternatively serves as the bandwidth management device.

After gatekeeper 112 receives the application requirements (500), gatekeeper 112 converts the application requirements to channel requirements (502). This requires converting the specified application requirements, such as bit rate, packet size, compression rate, codec type, compression type, total cumulative bit rate, total transmit and receive bit rates, transmit and receive video and audio bit rates, video frame rate, source attributes, distribution of IP packet sizes, into channel resources, that is, slots per second, that will be required for the delay-sensitive application. The actual mapping of application requirements to channel requirements varies. Any suitable alternative is available for converting the application requirements to the channel requirements, including a look-up table indexed on an application requirement or an algorithm to dynamically convert the application requirements to the channel requirements. Preferably, a prior analysis of application requirements or exemplary applications is used to provide a fixed mapping from application requirements to channel requirements, that is, slots per second required.

After the channel bandwidth requirement, in terms of slots per second, is determined (502), the bandwidth management device, gatekeeper 112, determines if the required number of slots per second is available on channel 400. Gatekeeper 112 stores data relating to the amount of bandwidth, or slots per second, available on channel 400. A comparison of the amount of bandwidth being currently used with the amount of bandwidth desired for the new delay-sensitive application determines whether there is bandwidth available on the channel. If the channel requirements cannot be met with the available bandwidth, then the applications request for transmission over the network is denied (506). This terminates the request and call (508), leaving the wireless terminal with the option to retry the request.

On the other hand, if the required channel bandwidth is available (504), then the needed bandwidth, that is, slots per second, is reserved on the channel (510). A method by which bandwidth is actually reserved varies depending upon the actual implementation. A preferred method for allocating the required bandwidth is discussed in detail below with respect to FIGS. 6–8. In summary, the preferred method of allocating the delay-sensitive bandwidth requires that a channel scheduler allocate the requesting wireless terminal a certain number or percentage of delay-sensitive slots in the incoming channel to support the application.

After the bandwidth is reserved on the channel (510), the application set up can be completed such that the application will proceed with the call (512). Continuing with the H.323 example of an audio/video call, after gatekeeper 112 determines that bandwidth is available (504) and has been reserved (510), a message is sent to the wireless terminal 102 that initiated the request (500). The H.323 application is notified that it should proceed with the call. This message from gatekeeper 112 is sent to wireless terminal 102 via the outgoing channel from base site 104.

After application set up is complete (512), the application proceeds with the call and the system 100 manages the bandwidth accordingly. More specifically, the application on the wireless terminal 102 generates IP packets in accordance with the application and without regard to the channel requirement. These IP packets generated by computer 122 are transferred to modem 124 for formatting and transmission over the incoming channel 404 of wireless channel 400. Typically the IP packets generated by the application must be transmitted in multiple slots over wireless channel 400. Modem 124 repackages the IP packets into slots for the wireless channel. After the data is repackaged for the channel slots, the wireless terminal 102 transmits the channel specific packets in the delay-sensitive slots that are granted to that particular wireless terminal 102.

As the call proceeds and packets are transmitted by the wireless terminal to the communication system 100, the communication system 100 preferably continually assesses the traffic and channel requirements (500). That is, gatekeeper 112, the bandwidth management device, preferably keeps or receives a count of the actual slots per second used by the application. This reflects the actual channel utilization used by the application. This actual channel utilization is preferably compared with the predicted channel bandwidth that is allocated or reserved to determine if an adjustment should be made to the bandwidth allocation. In accordance with this comparison adjustments are preferably made.

In a preferred embodiment as described above, where channel slots are allocated on a device basis, if additional applications require delay-sensitive slots for an application on the device, then a new bandwidth request must be made (518). This new bandwidth request mirrors the request made in step 500, described above. Based on the new bandwidth request, new channel requirements are determined (502) and the call is allowed to proceed if the new bandwidth request can be satisfied (504). If the additional bandwidth is not available, the request for a call is denied (506, 508). If the new bandwidth request can be satisfied, then the bandwidth is reserved (510); the application is set up (512); and the call proceeds (514).

Figure 6:
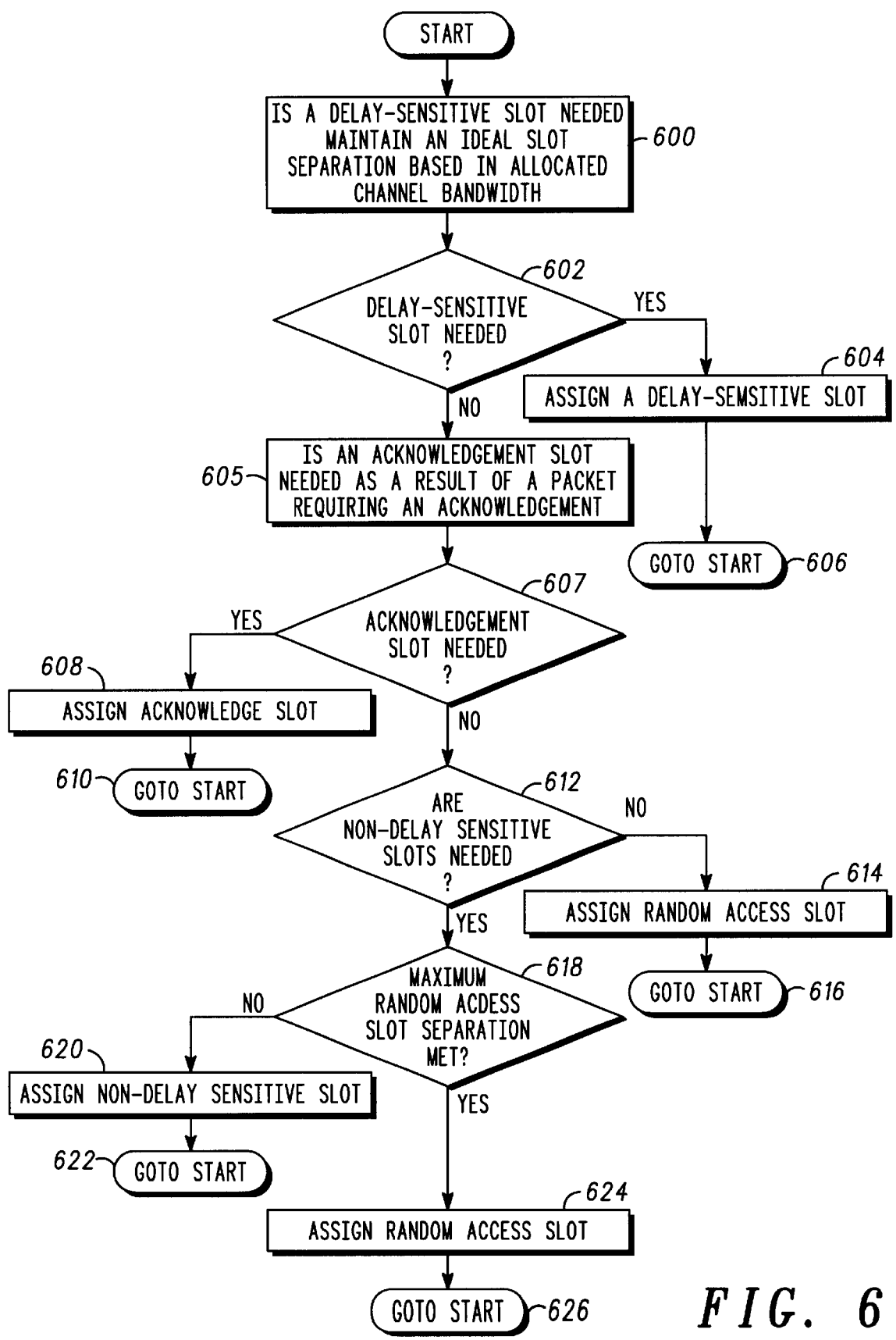
FIG. 6 is a flow chart illustrating a method for determining how a time slot in a wireless channel will be allocated in accordance with the present invention.

FIG. 6 is a flow chart illustrating a method for determining the type of slot that will be scheduled next on the incoming channel 404. More specifically, the channel scheduler determines whether the next slot in the incoming channel should be scheduled as a delay-sensitive slot, a non-delay-sensitive slot, an ACK slot or a random access slot. This slot scheduling determines the channel resources that are dedicated to the slot type. Also, the method guarantees that the allocated or reserved bandwidth for delay-sensitive, streaming data such as audio and video, is maintained.

First the channel scheduler determines whether a delay-sensitive slot should be scheduled next to maintain an ideal slot separation based on the allocated or reserved channel bandwidth for delay-sensitive applications (600). The ideal slot separation is calculated by dividing the total number of slots that occur in one second on the incoming channel by the number of slots per second allocated or reserved for delay-sensitive applications for a particular wireless terminal. For example, for an incoming channel running at 100 slots per second, a wireless terminal that has delay-sensitive applications requiring 20 slots per second results in an ideal slot separation of five slots. Delay-sensitive slots should be scheduled to meet the ideal slot separation for a wireless terminal or if the time has passed for a delay-sensitive slot to be allocated to maintain the ideal slot separation, then a delay-sensitive slot is needed (602). A preferred method for calculating ideal slot separation and determining whether a delay-sensitive slot is required is discussed below with respect to FIG. 7. If a delay-sensitive slot is needed (602), then a delay-sensitive slot is assigned to the next available slot on the incoming channel 404 (604). The method then restarts to determine what the next slot should be (606).

If a delay-sensitive slot is not required (602) then the channel scheduler preferably determines whether an acknowledgment slot is needed (605). The channel scheduler is aware of whether a particular transfer during a slot represents the completion of an application packet, such as an IP packet. For IP packets that require an acknowledgement, the channel scheduler notes when the last slot of the packet data is transmitted and hence knows that an acknowledgement slot should be allocated to acknowledge receipt of the packet. If an acknowledgement slot is required (607), then the next slot is assigned as an acknowledgment slot (608). After the slot assignment is made, the method restarts for a determination of the next slot type (610).

If no acknowledgment slot is needed (607) then the channel scheduler determines whether there are any non-delay-sensitive slots needed (612). The scheduler is aware of the wireless terminals 102 requirements for non-delay-sensitive transfers by virtue of the requests to send non-delay-sensitive transfers, which requests are made over the random access slots. If no outstanding non-delay-sensitive requests are awaiting transfer, then the scheduler knows there are no non-delay-sensitive slots needed, and therefore, assigns the next slot as a random access slot (614). After assigning the random access slot the method restarts to determine the next available slot (616).

If on the other hand, there are non-delay-sensitive slots needed by a wireless terminal, then the scheduler determines whether a maximum random access slot separation has been met (618). The maximum random access slot separation is a predetermined number of non-delay-sensitive slots that may occur before a random access slot is granted. The maximum random access slot separation is used to insure that random access slots, which serve as the point for initiating access by wireless terminals, occur at regular intervals over the incoming channel. If the maximum random access slot separation has not been met (618), then the next slot is assigned a non-delay-sensitive slot (620). After this slot assignment, the method returns to start to determine the next slot (622). On the other hand, if the maximum random access slot separation has been met (618) indicating that the maximum period between random access slots has occurred, then a random access slot is assigned (624). After this slot assignment is made, the method restarts for a determination of the next slot (626).

In a preferred embodiment of the invention, the maximum random access slot separation is stored by the channel scheduler and a counter is initialized to zero after any random access slot is granted. The random access slot counter is incremented by 1 for every non-delay-sensitive slot that is granted after the random access slot is granted. A comparison between the random access slot counter and the maximum random access slot separation value is made to determine whether the maximum random access slot separation has been met. When the maximum random access slot separation is met, then a random access slot is assigned, rather than a non-delay-sensitive slot, as discussed above.

Figure 7:
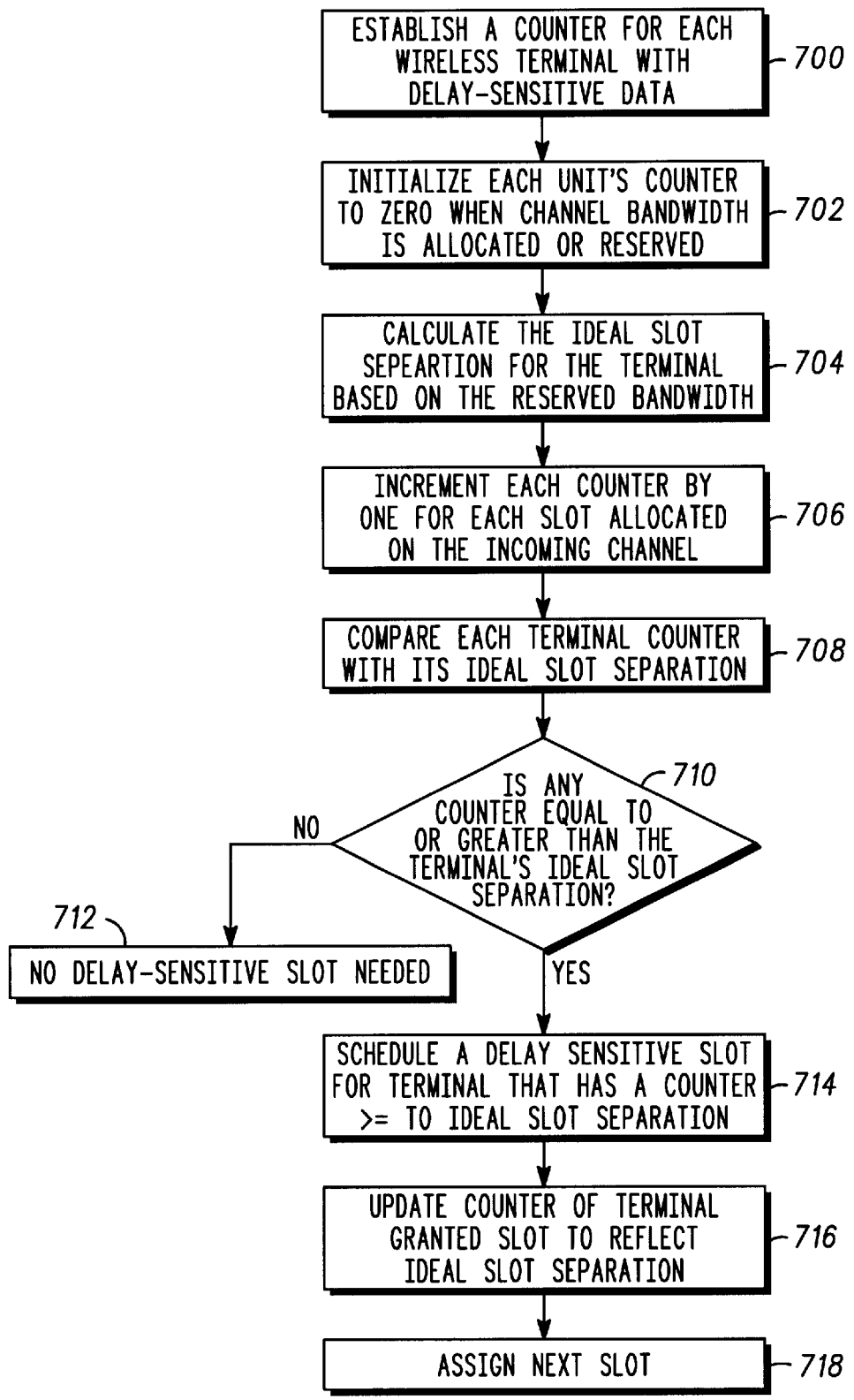
FIG. 7 is a flow chart illustrating a method for determining whether a delay-sensitive slot is needed in a wireless channel in accordance with the present invention.

FIG. 7 is a flow chart illustrating a preferred method for determining whether a delay-sensitive slot is needed on the incoming channel as described in steps 600 and 602 of FIG. 6. First, a counter is established for each wireless terminal with delay-sensitive data (700). As discussed above with respect to FIG. 5, wireless terminals that need to transmit delay-sensitive data, such as audio and video data, receive an allocation of channel bandwidth in accordance with the applications requirements.

Each counter for a wireless terminal is initialized to zero when the channel bandwidth is allocated or reserved for that terminal (702). The ideal slot separation for each terminal is calculated based on the reserved channel bandwidth (704).

Figure 5:
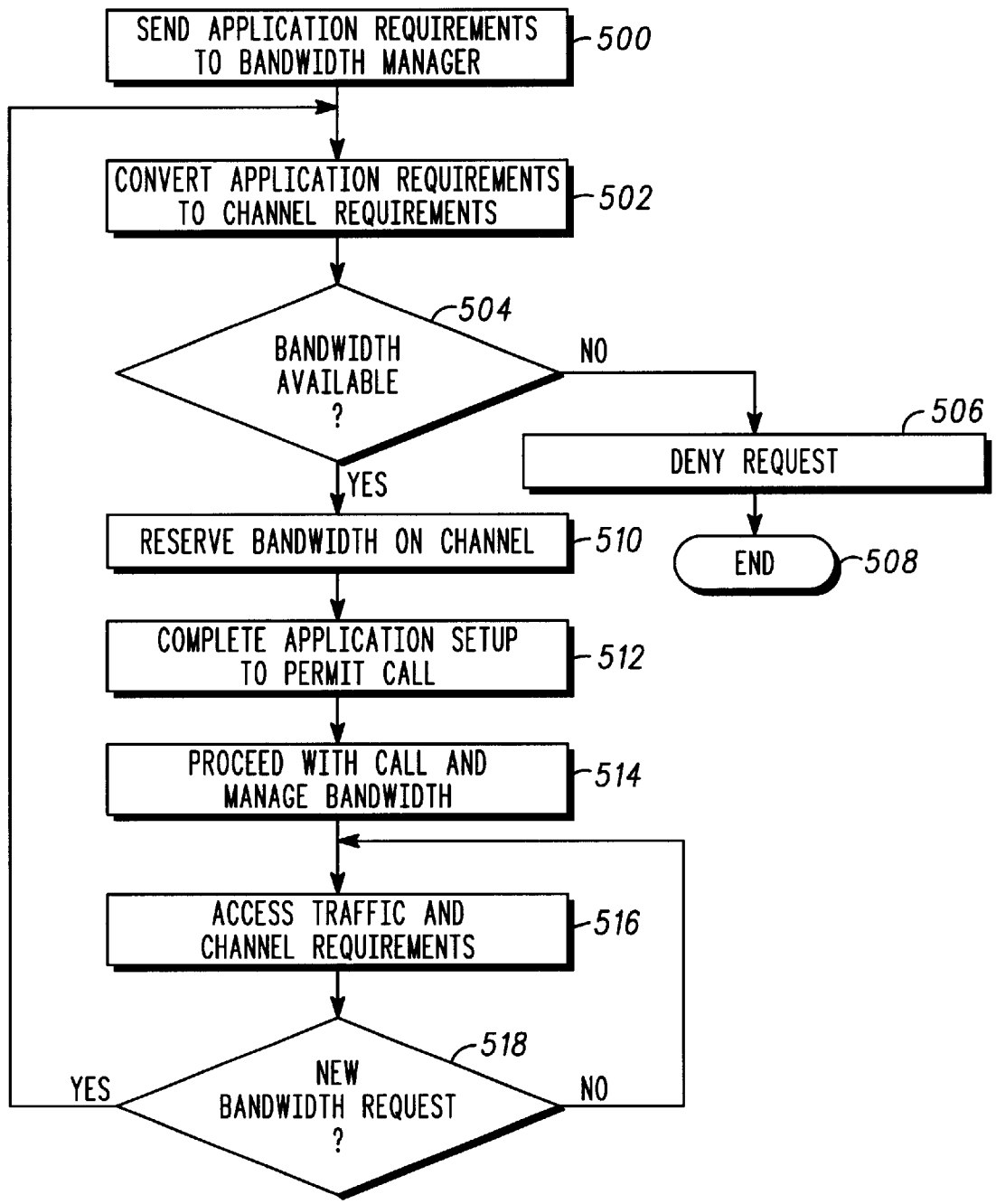
FIG. 5 is a flow chart illustrating a method for determining and reserving bandwidth allocation over a wireless multimedia channel in accordance with the present invention.

The ideal slot separation for a terminal is calculated by dividing the total number of slots that occur in one second on the incoming channel by the number of slots per second reserved or allocated to a particular terminal (see FIG. 5).

Each counter for each terminal is incremented by one for each slot that occurs on the incoming channel (706). That is, each counter keeps up with the number of slots occurring on the incoming channel since a slot was granted to the particular wireless terminal. For each slot allocation, the channel scheduler compares each terminal's counter with the terminal's ideal slot separation (708). If none of the terminal's counters is equal to or greater than the terminal's ideal slot separation (710), then no delay-sensitive slot needs to be scheduled by the channel scheduler (712). (See step 602 of FIG. 6).

If, on the other hand, any terminal's counter is equal to or greater than the terminal's ideal slot separation (710), then a delay-sensitive slot should be scheduled for the terminal that has its counter value equal to or greater than the ideal slot separation (714). It is possible that more than one wireless terminal will have its counter equal to or greater than the terminal's ideal slot separation at any slot. In this case, the channel scheduler preferably selects one of the terminals to be assigned the delay-sensitive slot. Most preferably, a channel scheduler selects the terminal that has a counter value that exceeds its ideal slot separation by the greatest amount. Ties are resolved by any suitable method that guarantees fair access.

For the wireless terminal that is granted the delay-sensitive slot, its counter is updated or re-initialized with the difference obtained from subtracting the ideal slot separation for that terminal from the counter value at the time the delay-sensitive slot was granted (716). In other words, the counters keep a count of the slots occurring since the last granted slot for a terminal. Once a terminal is granted a slot, the counter must be reset. To accommodate situations where a terminal's counter exceeds the ideal slot separation due to contention from other terminals, the counter is reset with a value that accounts for the wait time for the terminal, which allows the counter to maintain the ideal slot separation. For example, if a wireless terminal's ideal slot separation is 10 and due to contention, the counter for that terminal reaches 12 prior to the terminal being granted a slot, then after a slot is granted to the terminal, the counter is reset with a value of 2 (12–10) such that the new counter value is used to attempt to readjust the time for the next granted slot so that the average time is close to the ideal slot separation. After the delay-sensitive slot is assigned, the next slot assignment is determined (718).

Figure 8:
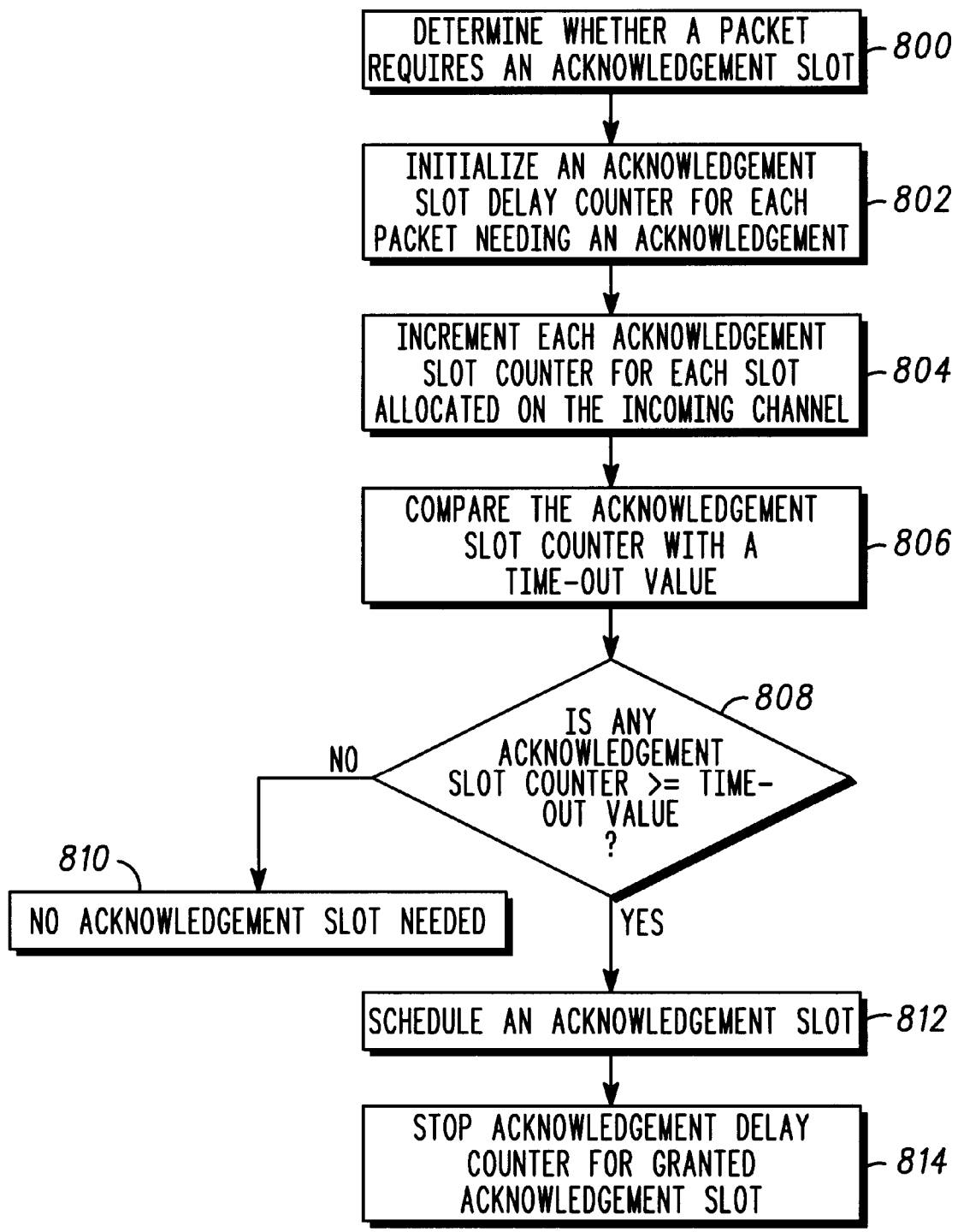
FIG. 8 is a flow chart illustrating a method for determining whether an acknowledgement slot is needed in a wireless channel in accordance with the present invention.

FIG. 8 is a flow chart illustrating a method for determining whether an ACK slot is needed for the incoming channel as described in steps 605 and 607 of FIG. 6. First, the channel scheduler determines whether an incoming slot includes an end of packet indication for a packet requiring an acknowledgment slot (800). For each end of packet slot found that requires an ACK slot, an acknowledgement slot delay counter is initialized with a value of zero (802). Each acknowledgement slot delay counter is incremented for each slot allocated on the incoming channel (804). That is, the acknowledgment slot delay counter counts the number of slots occurring since a scheduler determined an acknowledgment slot was required.

As each slot is allocated on the incoming channel, a comparison is made of the acknowledgment slot delay counters with an acknowledgment slot time out value (806). The acknowledgement slot time out value is a predetermined value entered into the system. The acknowledgement slot time out value reflects an ideal time for acknowledgments to be made. If no acknowledgement slot delay counter has reached the acknowledgement slot time out value (808), then no acknowledgement slot needs to be scheduled on the incoming channel. If on the other hand, an acknowledgment slot delay counter is equal to or greater than the acknowledgement slot time out value (808), then an ACK slot should be scheduled on the incoming channel (812). After an acknowledgment slot is granted for a corresponding acknowledgement slot delay counter, then the counter is stopped or ignored (814).

By virtue of the present invention, delay-sensitive applications, such as video and audio transmissions, are allocated bandwidth on a wireless channel to guarantee performance. The applications need not be aware of the wireless channel requirements or protocol. Advantageously, selective allocation of bandwidth permits efficient management of the wireless channel.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description, but embraces all such alterations, modifications and variations in accordance with the spirit and scope of the appended claims.

What is claimed is:

1. A method for allocating bandwidth on a radio frequency channel for transferring delay-sensitive data, the method comprising the steps of:
  receiving a request to transfer delay-sensitive data, wherein the request comprises parameters defining an application requirement;
  converting the application requirement into a channel bandwidth requirement, wherein the channel bandwidth requirement is dependent on at least one characteristic of the radio frequency channel;
  determining whether the channel bandwidth requirement exceeds an amount of bandwidth currently unallocated on the radio frequency channel; and
  allocating bandwidth on the radio frequency channel to transfer the delay-sensitive data, while maintaining existing allocations on the radio frequency channel, if the channel bandwidth requirement does not exceed the amount of bandwidth currently unallocated on the radio frequency channel.

2. The method of claim 1 further comprises the step of:
  denying the request to transfer delay-sensitive data if the channel bandwidth requirement exceeds the amount of bandwidth currently unallocated on the radio frequency channel.

3. The method of claim 1 further comprising the step of:
  sending an indication to an originator of the request to transfer delay-sensitive data, wherein, if the channel bandwidth requirement does not exceed the amount of bandwidth currently unallocated on the radio frequency channel, the indication indicates the request may proceed.

4. The method of claim 1 wherein the delay-sensitive data is at least one of video data and audio data.

5. The method of claim 1 wherein the parameters include at least one of bit rate, packet size, compression rate, codec type, compression type, total cumulative bit rate, total transmit and receive bit rates, transmit and receive video and audio bit rates, video frame rate, source attributes, distribution of IP packet sizes.

6. The method of claim 3 further comprising the steps of:
updating the amount of bandwidth unallocated on the radio frequency channel to reflect the bandwidth allocated in the step of allocating; and
assessing an actual channel utilization due to the delay-sensitive data.

7. The method of claim 6 further comprising changing the channel bandwidth requirement based on the actual channel utilization.

8. The method of claim 6 further comprising the steps of:
receiving an additional request to transfer additional delay-sensitive data, wherein the additional request comprises parameters defining an additional application requirement;
converting the additional application requirement into an additional channel bandwidth requirement, wherein the additional channel bandwidth requirement is dependent on at least one characteristic of the radio frequency channel;
determining whether the additional channel bandwidth requirement exceeds an amount of bandwidth currently unallocated on the radio frequency channel; and
allocating additional bandwidth on the radio frequency channel to transfer the additional delay-sensitive data, while maintaining existing allocations on the radio frequency channel, if the additional channel bandwidth requirement does not exceed the amount of bandwidth currently unallocated on the radio frequency channel.

9. The method of claim 1 wherein the channel bandwidth requirement is a function of at least one of the parameters defining the application requirement.

10. The method of claim 1 wherein the channel bandwidth requirement is determined by a look-up chart indexed on at least one of the parameters defining the application requirement.

11. The method of claim 1 wherein the step of allocating further comprises selectively granting an originator of the request access to the radio frequency channel to meet the channel bandwidth requirement.

12. An apparatus for allocating bandwidth on a radio frequency channel for transferring delay-sensitive data, the apparatus comprising:
an interface for receiving a request to transfer delay-sensitive data, wherein the request comprises parameters defining an application requirement; and
a processor coupled to the interface that:
receives the parameters defining the application requirement;
converts the application requirement into a channel bandwidth requirement, wherein the channel bandwidth requirement is dependant on at least one characteristic of the radio frequency channel;
determines whether the channel bandwidth requirement exceeds an amount of bandwidth currently unallocated on the radio frequency channel; and
allocates bandwidth on the radio frequency channel to transfer the delay-sensitive data, while maintaining existing allocations on the radio frequency channel, if the channel bandwidth requirement does not exceed the amount of bandwidth currently unallocated on the radio frequency channel.

13. The apparatus of claim 12 wherein the processor denies the request to transfer delay-sensitive data if the channel bandwidth requirement exceeds the the amount of bandwidth currently unallocated on the radio frequency channel.

14. The apparatus of claim 12 wherein the processor sends an indication to an originator of the request to transfer delay-sensitive data, wherein, if the channel bandwidth requirement does not exceed the the amount of bandwidth currently unallocated on the radio frequency channel, the indication indicates the request may proceed.

15. The apparatus of claim 12 wherein the delay-sensitive data is at least one of video data and audio data.

16. The apparatus of claim 12 wherein the parameters include at least one bit rate, packet size, compression rate, codec type, compression type, total cumulative bit rate, total transmit and receive bit rates, transmit and receive video and audio bit rates, video frame rate, source attributes, distribution of IP packet sizes.

17. The apparatus of claim 14 wherein the processor:
updates the amount of bandwidth unallocated on the radio frequency channel to reflect the bandwidth allocated in the step of allocating; and
assesses an actual channel utilization due to transmission of the delay-sensitive data.

18. The apparatus of claim 17 wherein the interface receives an additional request to transfer additional delay-sensitive data, wherein the additional request comprises parameters defining an additional application requirement; and
the processor:
converts the additional application requirement into an additional channel bandwidth requirement, wherein the additional channel bandwidth requirement is dependant on at least one characteristic of the radio frequency channel;
determines whether the additional channel bandwidth requirement exceeds an amount of bandwidth currently unallocated on the radio frequency channel; and
allocates additional bandwidth on the radio frequency channel to transfer the additional delay-sensitive data, while maintaining existing allocations on the radio frequency channel, if the additional channel bandwidth requirement does not exceed the amount of bandwidth currently unallocated on the radio frequency channel.

19. The apparatus of claim 12 wherein the channel bandwidth requirement is a function of at least one of the parameters defining the application requirement.

20. The apparatus of claim 12 wherein the channel bandwidth requirement is determined by a look-up chart indexed on at least one of the parameters defining the application requirement.

21. The apparatus of claim 12 wherein the processor selectively grants an originator of the request access to the radio frequency channel to meet the channel bandwidth requirement.

22. The apparatus of claim 16 wherein the processor changes the channel bandwidth requirement based on the actual channel utilization.

23. The method of claim 1 wherein the step of allocating comprises the step of granting slots on the radio frequency channel to an originator of the request in a periodic fashion.

* * * * *